US010598793B2

(12) United States Patent
Öhrlund et al.

(10) Patent No.: US 10,598,793 B2
(45) Date of Patent: Mar. 24, 2020

(54) NAVIGATION FOR A ROBOTIC WORK TOOL (71) Applicant: HUSQVARNA AB, Huskvarna (SE)

(72) Inventors: Magnus Öhrlund, Malmbäck (SE); Peter Reigo, Djursholm (SE)

(73) Assignee: HUSQVARNA AB, Huskvarna (SE)

( * ) Notice: Subject to any disclaimer, the term of this patent is extended or adjusted under 35 U.S.C. 154(b) by 334 days.

(21) Appl. No.: 15/539,356

(22) PCT Filed: Nov. 26, 2015

(86) PCT No.: PCT/EP2015/077844
§ 371 (c)(1),
(2) Date: Jun. 23, 2017

(87) PCT Pub. No.: WO2016/102141
PCT Pub. Date: Jun. 30, 2016

(65) Prior Publication Data
US 2017/0357006 A1    Dec. 14, 2017

(30) Foreign Application Priority Data
Dec. 24, 2014  (SE) ..................................... 14516629

(51) Int. Cl.
*G01S 19/14*  (2010.01)
*A01D 34/00*  (2006.01)
(Continued)

(52) U.S. Cl.
CPC ............ *G01S 19/14* (2013.01); *A01D 34/008* (2013.01); *G01C 21/165* (2013.01); *G01S 19/49* (2013.01);
(Continued)

(58) Field of Classification Search
CPC .... G05D 1/0219; G05D 1/0265; G05D 1/027; G05D 1/0272; G05D 1/0278; G05D 1/028; G01S 19/14; G01S 19/49; G01C 21/165
(Continued)

(56) References Cited

U.S. PATENT DOCUMENTS

2002/0099481 A1  7/2002 Mori
2006/0076917 A1  4/2006 Lim et al.
(Continued)

FOREIGN PATENT DOCUMENTS

WO  2012014134 A1  2/2012
WO  2015072896 A1  5/2015

OTHER PUBLICATIONS

International Search Report and Written Opinion for International Application No. PCT/EP2015/077844 dated Mar. 2, 2016.
(Continued)

*Primary Examiner* — Harry K Liu
(74) *Attorney, Agent, or Firm* — Burr & Forman LLP (57) ABSTRACT A robotic work tool system, comprising a robotic work tool, said robotic work tool comprising a position determining device for determining a current position and at least one deduced reckoning (also known as dead reckoning) navigation sensor, the robotic work tool being configured to determine that a reliable and accurate current position is possible to determine and in response thereto determine an expected navigation parameter, compare the expected navigation parameter to a current navigation parameter to determine a navigation error, determine if the navigation error is negligible, and if the navigation error is not negligible, cause the robotic work tool to change its trajectory to accommodate for the navigation error. Wherein the robotic work tool (100) is further configured to change the trajectory by
(Continued)

aligning the trajectory with an expected trajectory, wherein the expected trajectory is determined as an expected direction originating from an expected position and wherein the robotic work tool (100) is configured to change the trajectory by returning to a position that should have been visited and aligning the trajectory with the expected direction originating from the expected position, said position that should have been visited being aligned with the expected direction originating from the expected position.

6 Claims, 5 Drawing Sheets (51) Int. Cl.
G01C 21/16 (2006.01)
G01S 19/49 (2010.01)
G05D 1/02 (2020.01)

(52) U.S. Cl.
CPC ............ *G05D 1/027* (2013.01); *G05D 1/028* (2013.01); *G05D 1/0219* (2013.01); *G05D 1/0265* (2013.01); *G05D 1/0272* (2013.01); *G05D 1/0278* (2013.01); *G05D 2201/0201* (2013.01); *G05D 2201/0203* (2013.01); *G05D 2201/0208* (2013.01); *G05D 2201/0215* (2013.01)

(58) Field of Classification Search
USPC ...................................... 342/357.52
See application file for complete search history.

(56) References Cited

U.S. PATENT DOCUMENTS

| | | |
|---|---|---|
| 2009/0228166 A1 | 9/2009 | Durkos et al. |
| 2011/0202175 A1 | 8/2011 | Romanov et al. |
| 2011/0307173 A1 | 12/2011 | Riley |
| 2013/0138246 A1* | 5/2013 | Gutmann ............. G05D 1/0231 700/253 |
| 2014/0333741 A1* | 11/2014 | Roumeliotis ............. G01S 5/16 348/61 |

OTHER PUBLICATIONS

International Preliminary Report on Patentability for International Application No. PCT/EP2015/077844 dated Jun. 27, 2017.

* cited by examiner

NAVIGATION FOR A ROBOTIC WORK TOOL

TECHNICAL FIELD

This application relates to a method and a robotic work tool system for an improved navigation for a robotic work tool.

BACKGROUND

Contemporary robotic work tools are becoming more and more advanced and are able to perform more and more advanced tasks such as executing advanced operation patterns. In the example of lawnmower robots the advanced working pattern may be a complicated mowing pattern based on the layout of a garden including bushes, garden islands and other structures. To successfully navigate such complicated areas some contemporary robotic work tools employ satellite navigation.

A satellite navigation or sat nav system is a system of satellites that provide autonomous geo-spatial positioning with global coverage. It allows small electronic receivers to determine their location (longitude, latitude, and altitude) to within a few metres, or even centimetres, using signals transmitted along a line-of-sight by radio from satellites. Receivers calculate the precise time as well as position and carrier phase, which can be used as a reference for scientific experiments. A satellite navigation system with global coverage may be termed a global navigation satellite system or GNSS (Global Navigation Satellite System).

The use of GNSS systems requires good reception of satellite signals to work reliably. The satellite signals may sometimes be blocked by buildings, roofs, awnings, foliage or trees. To improve the accuracy of GNSS systems a reference receiver, or beacon, within a short distance from the target receiver can be used. This is called differential GNSS. There are several DGNSS techniques, such as the classical DGNSS (or DGPS), the Real Time Kinematics (RTK) and the Wide Area RTK (WARTK).

However, the signal from a beacon may also be blocked by for example a house if the garden or other work area extends around the building.

It should be noted that similar problems exist also for other position determining devices, such as using optical beacons where the line of sight may be blocked in certain areas.

If the robotic work tool is unable to correctly receive the signals from the position determining system, the robotic work tool will be challenged to correctly navigate the work area and a satisfactory coverage of the work area may not be achieved by the robotic work tool.

Also, when a robotic work tool re-establishes a connection with the position determining system the robotic work tool is most likely in a different position than it should be leading to an increased risk of some areas not being operated in, leaving an uneven result Even though the problems above have been discussed for lawnmower robotic work tools, the same or similar problems exist also for other robotic work tools.

There is thus a need for a manner of enabling reliable operation of a robotic work tool even in situations where the robotic work tool may not be able to receive reliable and accurate signals.

SUMMARY

It is an object of the teachings of this application to overcome the problems listed above by providing a robotic work tool comprising a position determining device for determining a current position and at least one deduced reckoning (also known as dead reckoning) navigation sensor, the robotic work tool being configured to determine that a reliable and accurate current position is possible to determine and in response thereto determine an expected navigation parameter, compare the expected navigation parameter to a current navigation parameter to determine a navigation error, determine if the navigation error is negligible, and if the navigation error is not negligible, cause the robotic work tool to change its trajectory to accommodate for the navigation error, wherein the robotic work tool is further configured to change the trajectory by aligning the trajectory with an expected trajectory, wherein the expected trajectory is determined as an expected direction originating from an expected position and wherein the robotic work tool is configured to change the trajectory by returning to a position that should have been visited and aligning the trajectory with the expected direction originating from the expected position, said position that should have been visited being aligned with the expected direction originating from the expected position.

In one embodiment the robotic work tool changes the trajectory by aligning the trajectory with an expected direction originating from an expected position.

In one embodiment the robotic work tool changes the trajectory by returning to a position that should have been visited and aligning the trajectory with an expected direction originating from expected position, said position that should have been visited being aligned with the expected direction originating from the expected position.

The navigation parameter may be one or a combination of position and direction.

It is also an object of the teachings of this application to overcome the problems listed above by providing a method for use in a robotic work tool system comprising a robotic work tool, said robotic work tool comprising a position determining device for determining a current position and at least one deduced reckoning navigation sensor, the method comprising determining that a reliable current position is possible to determine and in response thereto determine an expected navigation parameter; comparing the expected navigation parameter to a current navigation parameter to determine a navigation error; determining if the navigation error is negligible, and if the navigation error is not negligible, causing the robotic work tool to change its trajectory to accommodate for the navigation error.

The inventors of the present invention have realized, after inventive and insightful reasoning that by comparing an expected position to a current position (or other navigation parameter) an error of the deduced reckoning navigation sensor may be determined and based on this the robotic work tool may be caused to realign with the expected position and direction so that all areas of the work area is covered or visited. The robotic work tool will thus be able to perform satisfactory without unneeded stops even in areas where position determining device is not reliable while still being able to perform a complicated operating pattern. As signals may be reliably received in most situations only smaller sections of a work area will be (herein referred to as) a blackout section. Should the robotic work tool not follow a complicated operating pattern exactly in those smaller sections, a satisfactory over-all operation will still be achieved. It is also possible to provide and execute complicated operating patterns also in such smaller areas.

It should be noted that (smaller) robotic work tools such as garden equipment operate in entirely different environments than for example large industrial (such as farming) equipment where the demands for safety are vastly different. For example a robotic lawnmower that navigates incorrectly and bumps into a structure will have little or no consequence, whereas a large equipment doing the same will have potentially disastrous consequences. As such, these two fields of industrial automated devices and (smaller) household robots are completely different fields of technology. Robotic work tools are thus not seen to comprise (larger) industrial equipment.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
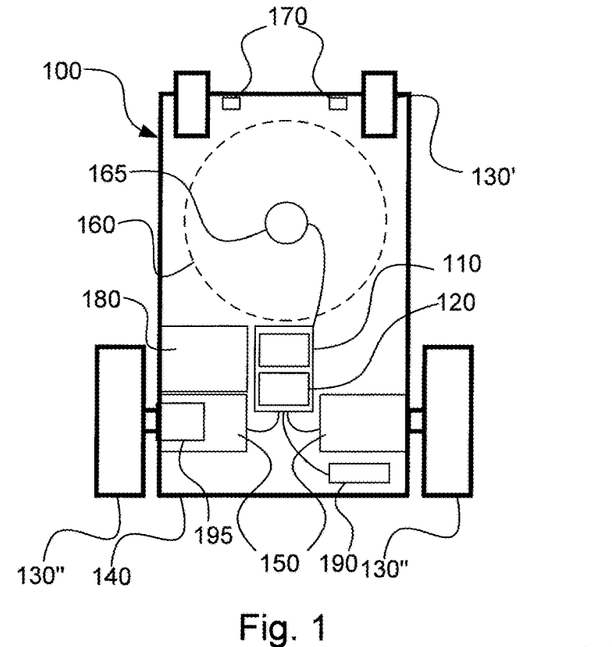
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further may have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

It should be noted that the teachings herein may also be used for a robotic work tool that is configured to operate in a work area, where the work area is not bounded by a boundary wire. Examples of such robotic work tools are tools arranged to physically detect a boundary by collision detection, or a robotic work tool that uses a position determination system (such as GNSS) to maintain a position within the work area, which work area is specified by coordinates.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a lawnmower robot. In one embodiment the robotic work tool 100 is a farming equipment. In one embodiment the robotic work tool 100 is a golf ball collecting tool.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The robotic work tool 100 also has (at least) one battery 180 for providing power to the motors 150 and the cutter motor 165. Alternatively or additionally the robotic work tool may have a fuel tank 180 for supplying fuel to any other type of engine 150.

The robotic work tool 100 is also arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device and to control the movements of the robotic work tool 100 based on the position.

Other examples of position determining devices 190 include optical (such as laser) position determining devices, other radio frequency position determining systems, and ultrawideband (UWB) beacons and receivers. The robotic work tool 100 is further arranged with at least one sensor 195 for providing signals for deduced reckoning navigation. Examples of such deduced reckoning navigation sensors 195 are odometers, accelerometers, gyroscopes and compasses.

Figure 2:
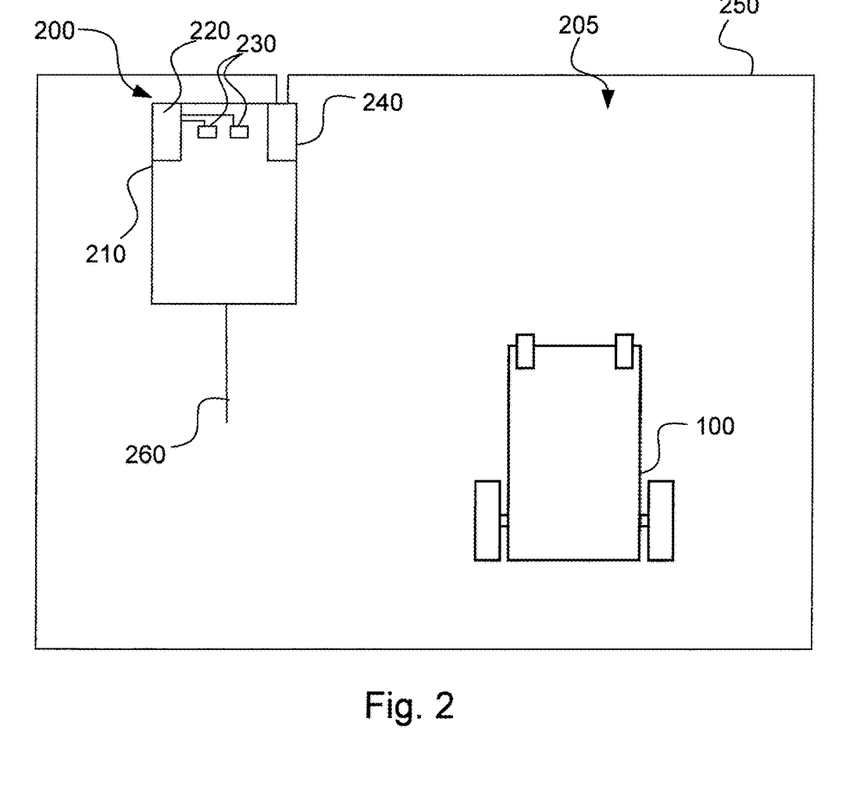
FIG. 2 shows a schematic view of a robotic work tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250. In one embodiment the guide wire 260 is used to generate a magnetic field for enabling the robotic work tool 100 to find the charging station without following a guide cable 260.

Figure 3:
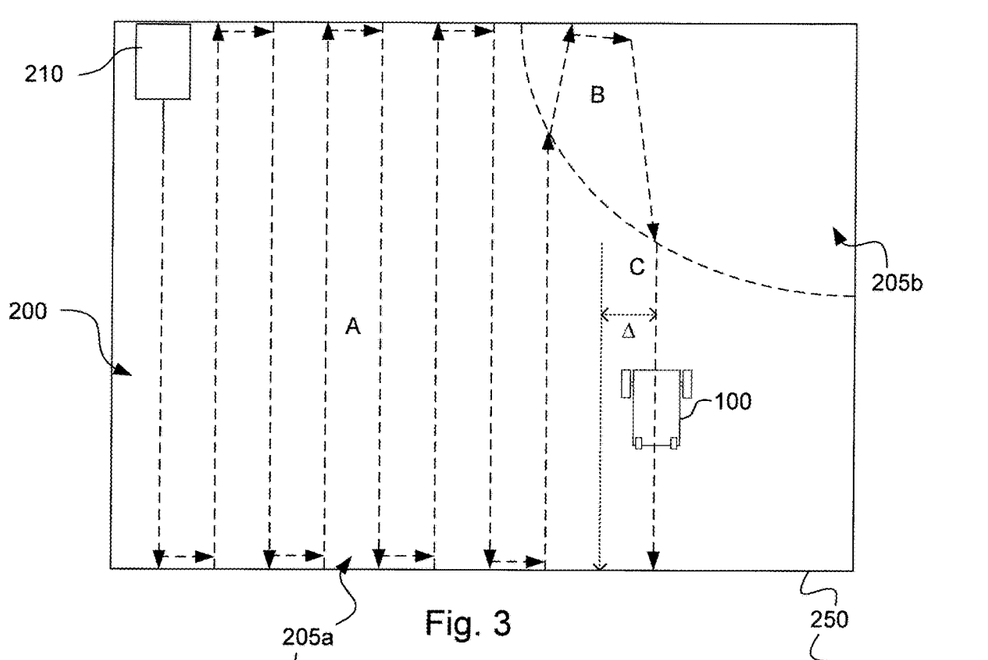
FIG. 3 shows a schematic view of a robotic work tool system in operation according to one embodiment of the teachings of this application.

FIG. 3 shows another schematic view of a robotic work tool system 200 according to the teachings herein, such as the robotic work tool system 200 of FIG. 2, being depicted here at a larger scale.

A boundary wire 250 encloses a working area 205 in which the robotic work tool 100 is configured to operate within. The working area 205 has a first section 205a in which GNSS navigation is possible and a second section 205b in which GNSS navigation is not possible. The first section 205 will hereafter be referred to as a GNSS section 205a and the second section 205b will be referred to as a blackout section 205b. The reason why GNSS navigation is not possible in the blackout section 205b may be due to buildings, roofs, awnings, trees or other foliage blocking the satellite signals or making the satellite signals unreliable.

The robotic work tool 100 is configured to utilize its GNSS device 190 to control its working operation. In the example of the robotic work tool 100 being a lawnmower robot, the controller 110 determines a mowing pattern based on a position of the robotic work tool 100. The mowing pattern may be determined as a heading to be taken or a circular pattern or other mowing pattern. The mowing pattern may also be based on a map of the work area 250. Such mowing patterns are known to a skilled person and will not be discussed further herein.

In the example of FIG. 3 the robotic work tool 100 is configured to operate in a manner determined based on a position retrieved from the GNSS device 190 as long as the GNSS device 190 is able to receive reliable signals from enough satellites or enough beacons. The controller 110 or the GNSS device 190 itself is configured to determine that the signals received are reliable and in response thereto determine execute a working pattern.

When the robotic work tool 100 is not able to receive reliable satellite signals, the controller 110 is configured to continue operation using an alternative navigation system or to determine an alternative mowing pattern that does not require (advanced) position determining.

It should be noted that when discussing the ability of receiving reliable signals it is meant to receive enough signals to establish a position reliably. The number of signals needed for this differs from GNSS device 190 to GNSS device 190 depending on which GNSS technology that is implemented in the GNSS device 190, as well as the operation and safety issues of the robotic work tool 100. For example, if only the position is of interest it suffices to receive three reliable signals to establish a reliable position, whereas if, for example, the amplitude or time is also of relevance, a fourth signal need be reliably received.

According to one embodiment of the teachings herein the robotic work tool 100 is configured to switch to deduced reckoning navigation when it determines that a reliable position may no longer be established. Deduced reckoning works so that the last known position and direction is taken to be the current and assumed direction and by for example measuring the number of wheel turns (or rather turn speed of the wheel axle and the time) the current position is determined. It should be noted that the technique of deduced reckoning is also taken to include other forms of relative navigation, such as visual/optical navigation systems, SLAM (Simultaneous Location And Mapping) and fingerprint fusion to name a few. As the robotic work tool 100 encounters the boundary wire 250 it turns and by counting the number of wheel turns the new direction can be determined and the controller 110 may control the operation of the robotic work tool 100 based on the position determined based on the deduced reckoning. An odometer 195 may also be used to determine the current position or turning angle in the deduced reckoning navigation mode.

As can be seen in FIG. 3 the resulting operating pattern B (in this example the mowing pattern) may differ from the GNSS based operating pattern A due to an error in the sensor equipment 195, such as compass or odometers, used for the deduced reckoning navigation.

When the robotic work tool 100 is again able to reliably receive GNSS signals, the controller 110 is configured to determine whether there has been a deduced reckoning navigation error by comparing a current position, which is received from the GNSS device 190, with an expected position and based on the difference determine if there is a non-negligible navigation error and in response thereto cause the robotic work tool 100 to change its current trajectory to align with the expected trajectory.

FIG. 3 shows an example situation where the robotic work tool 100 is executing a mowing pattern which is based on moving in parallel lines to cover the working area 205.

As the robotic work tool 100 traverses the GNSS section 205a of the work area 205 it is guided by the signals received by the GNSS device 190 and the lines are parallel and of equal length. The resulting mowing pattern is indicated A in the figure. As the robotic work tool 100 enters the blackout section 205b and is no longer able to receive reliable signals it switches to deduced reckoning navigation. The resulting mowing pattern B consists of almost parallel lines. However, depending on the angle between the movement lines and the distance traveled (i.e. the size of the blackout area 205b) the robotic work tool 100 will re-enter the GNSS section 205a at a distance from where it would have been if it had used GNSS navigation. As the robotic work tool 100 re-enters the GNSS section 205a, that is, when it again is able to receive reliable signals, it compares its current position with an expected position. In the example of FIG. 3 the robotic work tool 100 re-enters the GNSS section 205a at point C. There the robotic work tool 100 determines the distance □ to the expected position. The expected position may be determined based on the time lapsed from last GNSS navigation session, the average speed of the robotic work tool 100 and the parameters of the mowing (or operation) pattern. The navigation parameters are the position and direction of travel.

If the controller 110 determines that the error □ is not negligible, the controller causes the robotic work tool 100 to change its trajectory to minimize the area that would be missed compared to operating with an errorless navigation.

Figure 4:
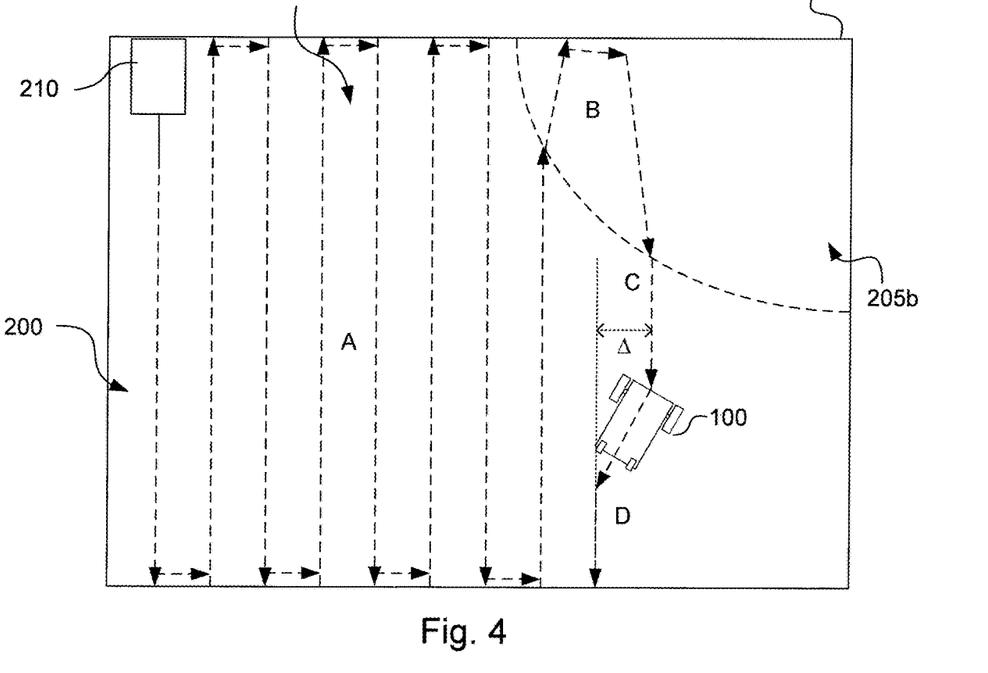
FIG. 4 shows a schematic view of a robotic work tool system in operation according to one embodiment of the teachings of this application.

The expected trajectory may be determined as being along an expected direction originating from the expected position, see FIG. 4. The expected direction may be the direction last used when the GNSS signal was lost or it can be a direction being determined based on the control data for the dead reckoning, which is based on the dead reckoning being accurate.

The expected position may be the position where the GNSS signal was lost or it can be a position being determined based on the control data for the dead reckoning navigation used when no GNSS signal was reliably received, which is based on the dead reckoning being accurate.

As the robotic work tool 100 has aligned its trajectory with the expected trajectory, the robotic work tool 100 will continue operating at position D along the expected trajectory.

The expected trajectory may alternatively be determined as being along an expected direction originating from a determined position that should have been visited. The position that should have been visited may be determined as a position in an area that is not blocked, see FIG. 5.

There are some differences between continuously navigating using deduced reckoning and regularly checking GPS locations to make sure that the correct path is followed (which actually requires that GPS positions are always available) and with solely relying on deduced reckoning when there are no GPS positions available.

One major difference in this is that a position that a mower relying on GPS will never deviate too far from the path as it relies on regular GPS updates, whereas in the present application the robotic work tool may operate and navigate successfully through a relatively large field where no GPS signal may be received reliably.

In such blackout areas, there may be many positions or area that have been missed and that should be revisited.

Figure 5:
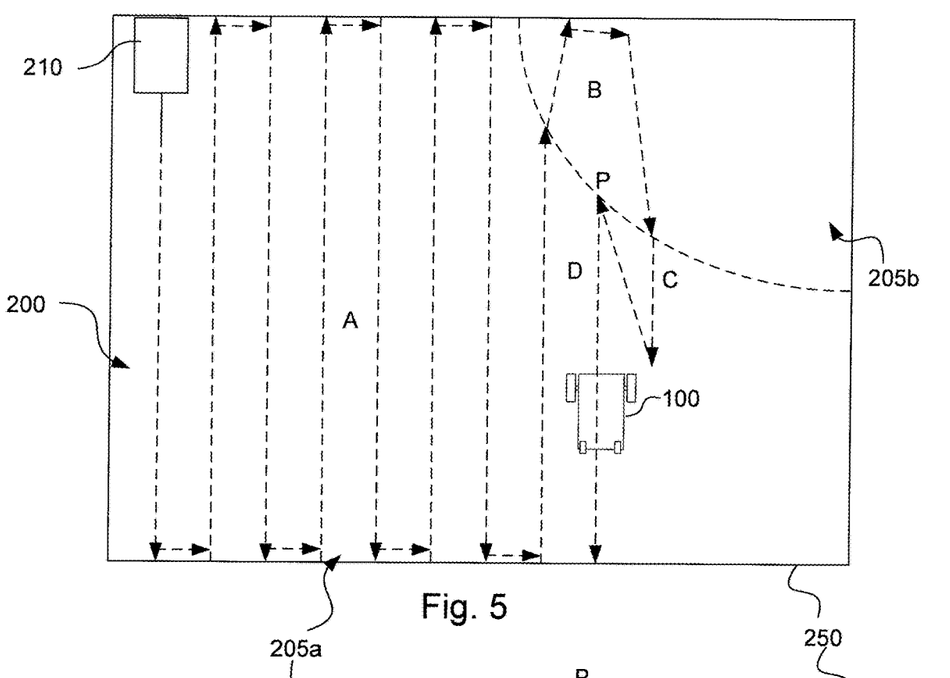
FIG. 5 shows a schematic view of a robotic work tool system in operation according to one embodiment of the teachings of this application.

A position that should have been visited P may be any position in the opposite direction of the expected trajectory. It should be noted that the expected trajectory may include turns or other direction changes, which may be backtracked by the control data used for controlling the dead reckoning navigation.

The position to have been visited P could be a position where the GNSS signal could have been received reliably again, but along the expected trajectory. The robotic work tool may determine such a point by extrapolating the positions known to have reliable GNSS signal reception.

The robotic work tool 100 may also determine the point to have been visited by travelling towards the expected trajectory and stopping when it notices that the GNSS signal is no longer received reliably and using this point as the point that should have been visited. Alternatively, the robotic work tool 100 may turn towards the expected trajectory more sharply as it notices that the GNSS signal is received at a lower signal strength level, thereby taking a shortcut to the expected trajectory when it is determined that the GNSS signal may be lost. Alternatively, the robotic work tool 100 may reverse when it detects that the GNSS signal is being received at a reduced signal level and travel towards the expected trajectory by an alternate route.

The GNSS signal may be determined to not be received reliably when the signal strength falls below threshold.

As the robotic work tool 100 reaches the expected trajectory, the robotic work tool 100 will continue operating at position D along the expected trajectory.

Figure 6:
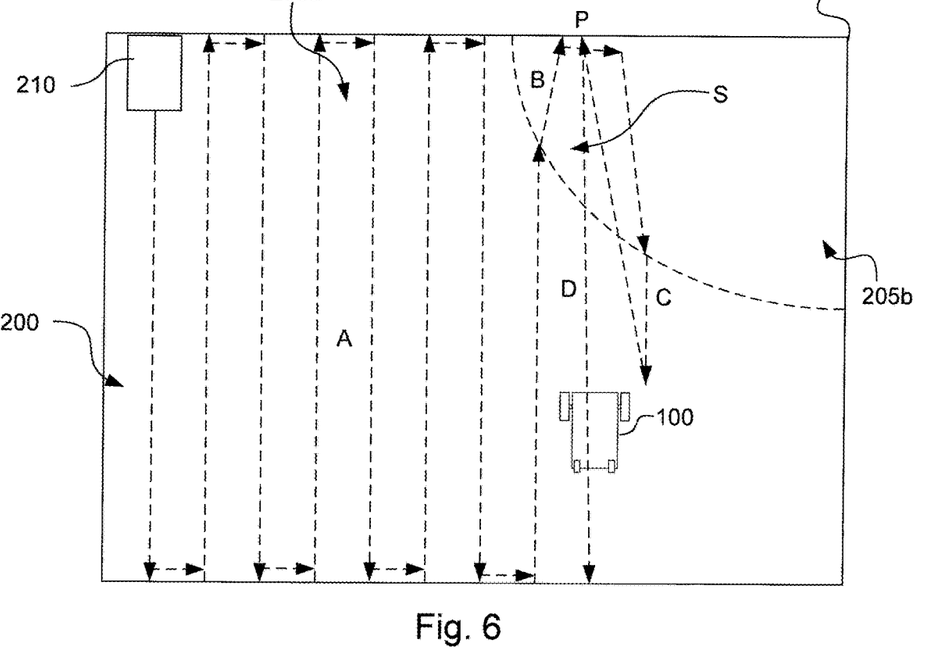
FIG. 6 shows a schematic view of a robotic work tool system in operation according to one embodiment of the teachings of this application.

The position that should have been visited may be determined as a position in an area that is blocked, see FIG. 6.

The position to have been visited P may be determined to be a point in a blacked area. As the navigation error may be used to calibrate the dead reckoning navigation, the robotic work tool 100 may now have a higher probability of successfully navigating the blacked out area. At least, the navigation error should be smaller and hopefully negligible.

The embodiments shown in FIGS. 5 and 6, thus show that it can be seen that instead of simply accommodating for any drift when navigating relying on GPS, the robot actually determines points that have been passed and that should have been visited and returns to these. This is also shown in FIG. 4. As is stated above, the point that should have been visited may be in a blacked out area, but as the robotic work tool may calibrate the deduced reckoning system, the robotic work tool should now be able to successfully navigate the blacked out area.

The robotic work tool 100 may thus travel towards the point that should have been visited by travelling towards a point being on a backtracked position of the expected trajectory, much as has been described above with reference to FIG. 5, but where the deduced reckoning navigation is used to navigate in the blacked out area. Should the navigation error still exist, repeated exits from the blacked out area should make the navigation error smaller and smaller.

It would also provide for an irregular operation in the blacked out are, thereby providing an even mowing result.

As the position that should have been visited is reached, the robotic work tool 100 will continue operating at position D along the expected trajectory.

The robotic work tool may also be configured to determine not only a position P that should have been visited but a whole section S that should have been visited. The robotic work tool 100 may then return to complete the operation in the whole section S either before proceeding or at a later time when its trajectory provides for an even and efficient return. The robotic work tool 100 is thus configured to postpone the operation in a point that should have been visited or a section S that should have been visited and need not take shortest path, but can take a more convenient one which possibly reduces the risk of tracks being formed.

Figure 7:
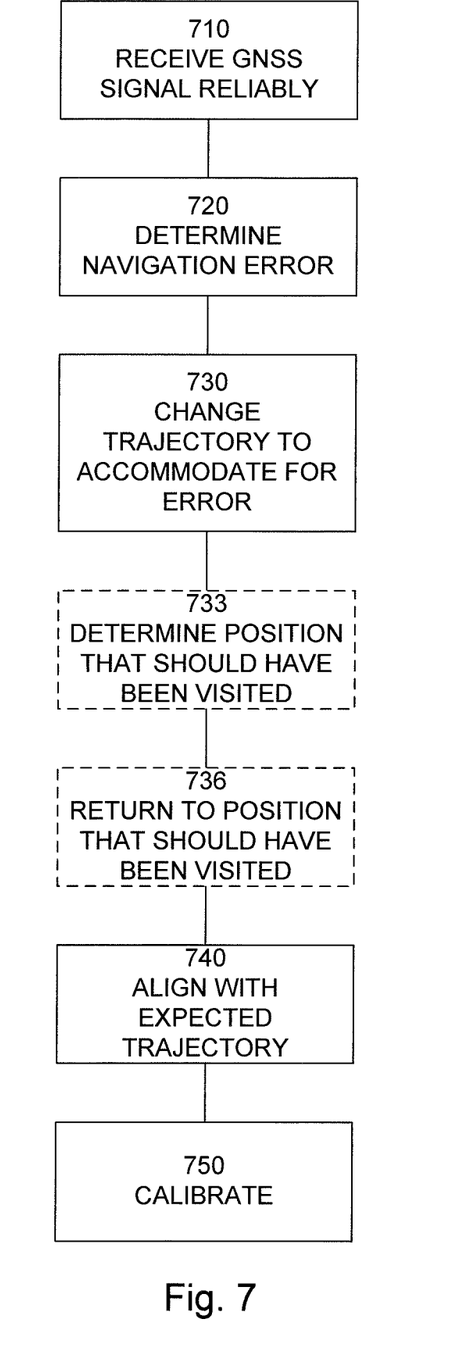
FIG. 7 shows a flowchart for a method for use in a robotic work tool system according to one embodiment of the teachings of this application.

FIG. 7, shows a flowchart for a general method according to the teachings herein which will be discussed in detail below.

The manner taught herein is especially useful for a robotic work tool that operates by traversing a work area in sections.

Figure 8:
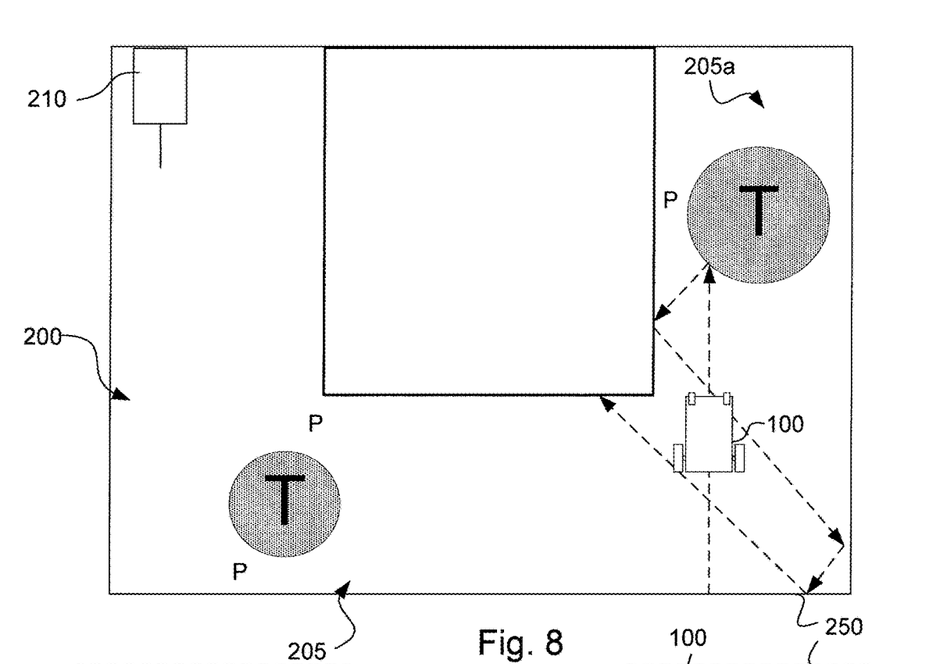
FIG. 8 shows a schematic view of a robotic work tool system in operation according to one embodiment of the teachings of this application.

FIG. 8 shows a schematic view of a robotic work tool system where the problem of the prior art is illustrated. Depicted is a schematic garden surrounding a house or other building. In the example of FIG. 8, there are two trees T. A robotic work tool 100 may find difficulties entering the area 205a behind the tree T in the upper right hand corner of a work area 205. The robotic work tool 100 may also find it difficult to navigate the passages indicated P pass the tree in the lower left hand side corner. A boundary wire 250 encloses the working area 205 in which the robotic work tool 100 is configured to operate within and each time the robotic work tool 100 comes upon the building, the tree or the boundary wire it will change direction as is indicated by the dashed arrows indicating a path of the robotic work tool 100. As can be seen, even though the robotic work tool 100 may be travelling towards the work area that is difficult to reach 205a, it will inadvertently be forced onto a path leading away from the work area 205a.

Figure 9:
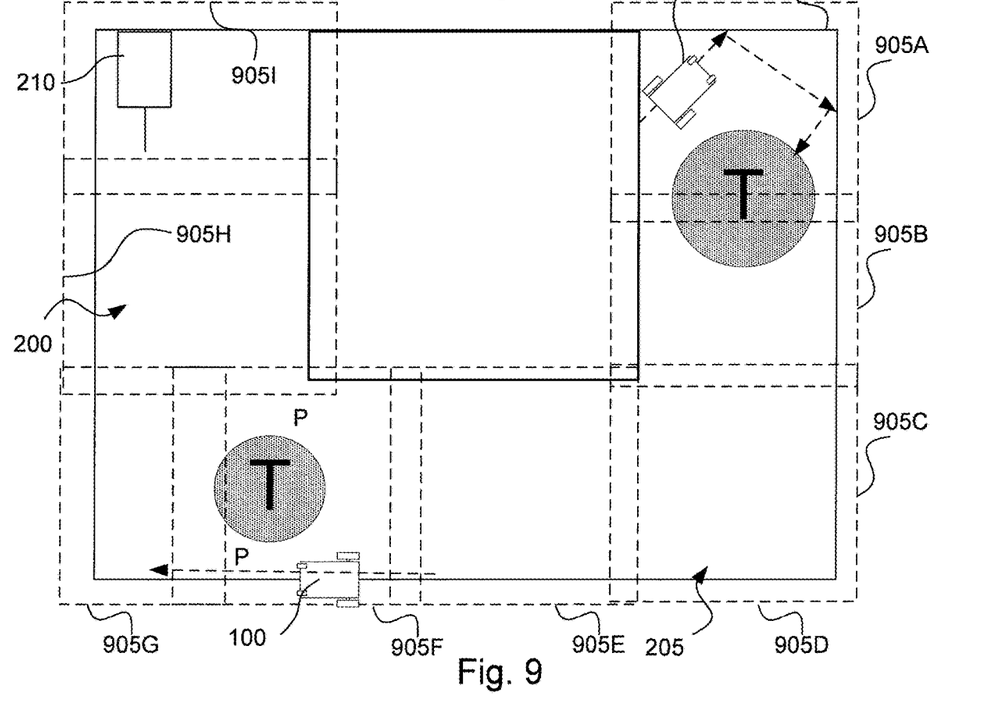
FIG. 9 shows a schematic view of a robotic work tool system in operation according to one embodiment of the teachings of this application.

FIG. 9 shows a schematic view of a robotic work tool system 200 according to the teachings herein, such as the robotic work tool system 200 of FIG. 2, where the problem is solved by a combination of a boundary wire and GNSS or deduced reckoning navigation or other navigation system. It should be noted that, as has been discussed in the above, the boundary wire may be a physical boundary wire or a boundary specified in the memory 240 of the robotic work tool 100 for GNSS or deduced reckoning assisted navigation.

The robotic work tool 100 is provided with a virtual map of the working area 205. The virtual map may simply be a collection of geographical positions, for example indicating the boundaries of the work area, or it may be a more detailed virtual or digital map.

The robotic work tool 100 is configured to divide the work area into sections 905A-I, either based on the map of the work area 205 (possibly being only corner coordinates) or by receiving from an external server or through user input. Alternatively or additionally, the sections are specified based on a current position of the robotic work tool 100, wherein the sections 905 may be defined as for example +/−10 m in all directions from a current position. In the example of FIG. 4, the sections are shown to be overlapping, however it should be noted that they may also be specified as being abutting each other or a combination thereof. By allowing the sections to overlap, the operating coverage between two sections is increased.

The robotic work tool 100 is thus configured to control its operation not only on a boundary wire (physical or virtual) (and/or on collision detection), but also on a virtual boundary of a section 905 of the work area 205 and as it is determined that the robotic work tool 100 is close to, is crossing or has crossed (hereafter referred to as encountering) a section boundary, the robotic work tool 100 will change its trajectory. A section 905 may be associated with a section time and the robotic work tool 100 may be configured to spend at least the section time within the associated section. The robotic work tool 100 may then be configured to reset a timer as it enters a new section 905. The robotic work tool 100 is thus configured to determine if section timer has not yet exceeded the associated section time when a section boundary is encountered, and if so change the trajectory of the robotic work tool 100.

The section time may be based on a size of the section, a configuration of the section and/or a complexity of a section. A section having many obstacles may be given a higher section time than an open section.

To ensure that the robotic work tool 100 actually also leaves a section 905, the robotic work tool 100 may be configured to determine that the section timer has exceeded the associated section time, and if so follow a boundary wire 250 out of the section next time the boundary wire 250 is encountered. In FIG. 9, this is illustrated as the robotic work tool 100 in the lower side of the garden following the boundary wire 250 out of section 905F and into section 905G. This also enables the robotic work tool 100 to easily navigate through passages P passed obstacles such as trees T. In one embodiment, the robotic work tool 100 is configured to order the sections in a working order and visit the sections 905 in the working order. For the example of FIG. 9, the robotic work tool 100 may be configured to visit the sections in the order 905I-905H-905G-905F-905E-905D-905C-905B-905A-905B-905C-905D-905E-905F-905G-905H-905I. In such an embodiment, the sections may also have different associated section times to ensure that an equal time is spent in each section. For the example given above, the associated section time for the last section 905A would be double the associated section times for the other sections.

The robotic work tool 100 may thus also be configured to determine that as an encountered section boundary does not border on a next section when a section boundary is encountered, and if so, change the trajectory of the robotic work tool 100. This allows for the robotic work tool 100 to keep looking for the correct section to proceed into, possibly by changing directions along the boundary wire 250 when it is being followed.

As the robotic work tool again is able to reliably receive signals it may determine that a section 905 has been missed or left prematurely. The robotic work tool may then determine that the missed or prematurely section is a section that should have been visited and return to operate in that section when the robotic work tool has finished operation in the section the robotic work tool is currently in. Either as a next section or at a later time. The section time for the current section may be restarted as it is discovered that the robotic work tool has skipped or escaped a section. The section time for the skipped or escaped section may then be extended when visited next time. Alternatively, the skipped or escaped section may be revisited for a section time equaling the remaining section time.

Especially, a robotic work tool operating in such sections and returning if one has been missed at a later time, will be perceived as simply working in a predetermined manner operating in one section at a time, and not, randomly going back and forth between sections which may seem erratic to an owner.

This enables for missed sections to be visited even if they have been missed due to navigation error which enables the deduced navigation to be implemented using affordable components without affecting the end result of the operation of the robotic work tool.

The robotic work tool 100 is thus able to perform and execute a satisfactory operating pattern even if GNSS signals may not be reliably received in all sections of the work area 205.

The manner taught herein also provides for a robotic work tool to allow time for retracking a lost satellite signal without showing an erratic behaviour such as stopping or temporarily deactivating. Such behaviour may cause tracks to be formed and may also be perceived as erratic by an owner thereby reducing the owner's satisfaction.

As mentioned above, FIG. 7, shows a flowchart for a general method according to the teachings herein. The robotic work tool 100 determines 710 that a reliable current position is possible to determine or receive reliably and in response thereto determine 720 an expected navigation parameter, compare the expected navigation parameter to a current navigation parameter to determine a navigation error, determine if the navigation error is negligible, and if the navigation error is not negligible, cause the robotic work tool 100 to change 730 its trajectory to accommodate for the navigation error. The robotic work tool may change the trajectory by 740 aligning the trajectory with an expected trajectory. Alternatively, the robotic work tool may change the trajectory by determining 733 a position that should have been visited P and returning 736 to that position that should have been visited P and aligning the trajectory 740 with an expected direction originating from expected position, said position that should have been visited being aligned with the expected direction originating from the expected position, possibly backtracked. The robotic work tool may also calibrate 750 the deduced reckoning navigation based on the determined error.

One benefit of the teachings herein is that a robotic work tool is enabled to provide a satisfactory mowing pattern even if the robotic work tool 100 is not able to establish a reliable position using the GNSS device 190.

It should be noted that even though the mowing pattern shown in the exemplifying figures are very simple, the teachings herein may be beneficially used to provide advanced mowing patterns taking into account obstacles or other (garden) architectural features.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool comprising a Global Navigation Satellite System (GNSS) device for determining a current position of the robotic work tool and at least one deduced reckoning navigation sensor, the deduced reckoning navigation sensor being configured to provide signals for deduced reckoning navigation, wherein the robotic work tool is configured to:
in response to the GNSS device determining the current position, operate based on the current position,
in response to the GNSS device no longer being able to determine the current position, continue operating using the deduced reckoning navigation,
determine that the GNSS device is again able to determine the current position and in response thereto determine an expected navigation parameter based on control data for the deduced reckoning navigation, the expected navigation parameter comprising an expected position and an expected direction of the robotic work tool,
compare the expected navigation parameter to a current navigation parameter to determine a navigation error, the current navigation parameter comprising the current position and a current direction of the robotic work tool,
determine if the navigation error is negligible,
in response to the navigation error not being negligible, cause the robotic work tool to change a trajectory to accommodate for the navigation error,
by aligning the trajectory with an expected trajectory of the robotic work tool, wherein the expected trajectory is determined as being along the expected direction originating from the expected position of the robotic work tool, and wherein the robotic work tool is further configured to:
perform the change of the trajectory by returning to a position that has been passed and should have been visited and aligning the trajectory with the expected direction originating from the expected position, said position that should have been visited being aligned with the expected direction originating from the expected position and not coinciding with the expected position, and
wherein the position that should have been visited is determined to be a point in an area in which the GNSS navigation is not possible or the position that should have been visited is a position where a GNSS signal could have been received again but along the expected trajectory.

2. The robotic work tool according to claim 1, wherein the expected position is a position being determined based on the control data for the deduced reckoning navigation used when no GNSS signal was received.

3. The robotic work tool according to claim 1, wherein the robotic work tool is configured to determine the position that should have been visited by extrapolating positions known to have GNSS signal reception.

4. The robotic work tool according to claim 1, wherein the robotic work tool is configured to calibrate the deduced reckoning navigation sensor based on the determined navigation error.

5. The robotic work tool according to claim 1, wherein the robotic work tool is a robotic lawnmower.

6. A method for operating a robotic work tool, said robotic work tool comprising a Global Navigation Satellite System (GNSS) device for determining a current position of the robotic work tool and at least one deduced reckoning navigation sensor, the deduced reckoning navigation sensor configured to provide signals for deduced reckoning navigation, the method comprising:
in response to the GNSS device determining the current position of the robotic work tool, causing the robotic work tool to operate based on the current position retrieved from the GNSS device;

in response to the GNSS device no longer being able to determine the current position, causing the robotic work tool to continue operating using the deduced reckoning navigation;
determining that the GNSS device is again able to determine the current position and in response thereto determining an expected navigation parameter based on control data for the deduced reckoning navigation, the expected navigation parameter comprising an expected position and an expected direction of the robotic work tool;
comparing the expected navigation parameter to a current navigation parameter to determine a navigation error, the current navigation parameter comprising the current position and a current direction of the robotic work tool;
determining if the navigation error is negligible;
in response to the navigation error not being negligible, causing the robotic work tool to change a trajectory to accommodate for the navigation error by aligning the trajectory with an expected trajectory, wherein the expected trajectory is determined as being along the expected direction originating from the expected position of the robotic work tool; and
performing the change of the trajectory by returning to a position that has been passed and that should have been visited and aligning the trajectory with the expected direction originating from the expected position of the robotic work tool, the position that should have been visited being aligned with the expected direction originating from the expected position and not coinciding with the expected position, wherein the position that should have been visited is determined to be a point in an area in which the GNSS navigation is not possible, or the position that should have been visited is a position where a GNSS signal could have been received again but along the expected trajectory.

* * * * *